March 12, 1963     B. F. THOMAS     3,080,648
SILVER SOLDERING APPARATUS AND METHOD
Filed Nov. 16, 1959
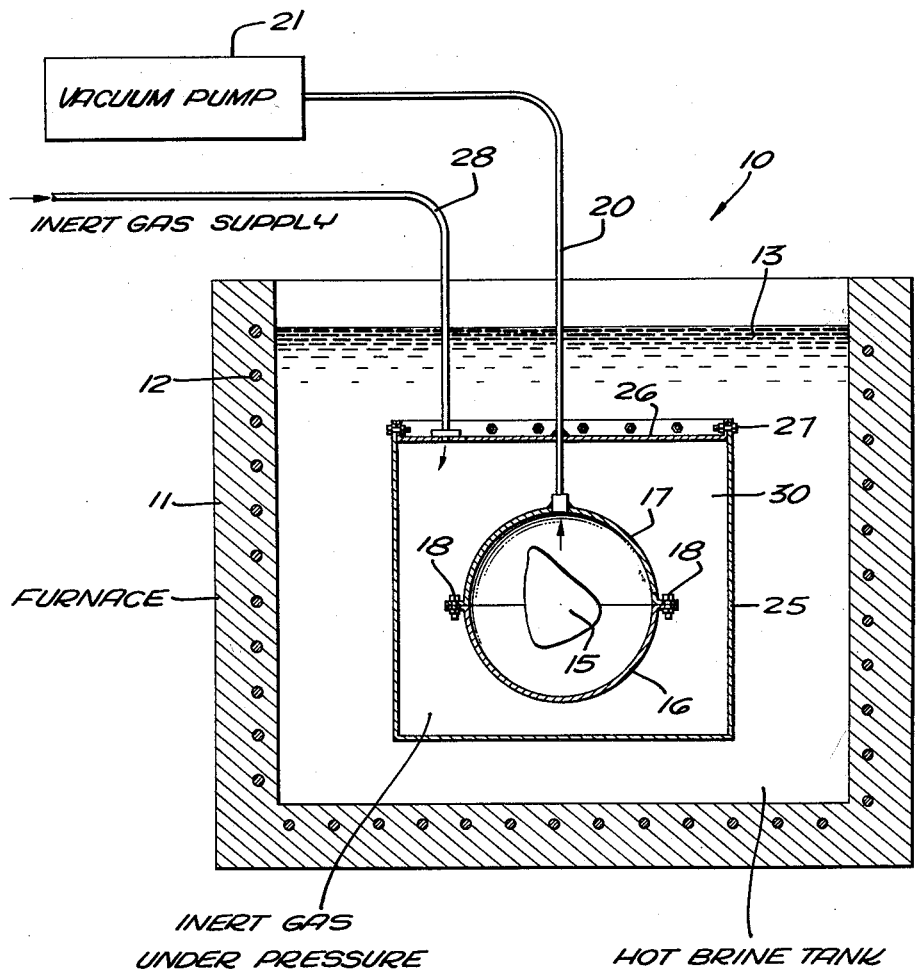
BOYD F. THOMAS
INVENTOR.
BY
ATTORNEY

United States Patent Office 3,080,648
Patented Mar. 12, 1963

3,080,648
SILVER SOLDERING APPARATUS AND METHOD
Boyd F. Thomas, Pasadena, Calif., assignor to Young Spring & Wire Corporation, Detroit, Mich., a corporation of Michigan
Filed Nov. 16, 1959, Ser. No. 853,073
7 Claims. (Cl. 29—494)

This invention relates to the heat fusing together of metal parts and more particularly to an improved technique and apparatus for silver soldering parts together with high precision characterized in that fushion takes place in an atmosphere devoid of oxidants by heat transfer from a molten salt bath and through inert gas.

During recent years there has been ever increasing exacting needs for high quality and higher precision fused metal joints. These needs have arisen particularly in the electronic and space flight technologies wherein the strongest possible joints of maximum uniformity and reliability utilizing an absolute minimum of material to full advantage are a prime requisite. Such specifications necessitate that the entire operation be carried out under precisely controlled conditions. It has been recognized heretofore that these requirements demand that fusion take place in the absence of oxidants of any character and that the temperature be carefully controlled and limited to that value actually required to fuse the junction metal.

This has been accomplished by sealing the parts to be joined within a chamber evacuated to preclude the presence of oxidants. To meet the exacting temperature control requirements it has been proposed to heat the evacuated chamber to the fusion temperature of the soldering material through a molten salt bath maintained accurately at the required temperature. However, it has been found that great risks are involved due to the highly transient character of the molten salt which characteristic is aided and abetted by the vacuum condition existing within the sealed chamber containing the parts undergoing juncture. The presence of the slightest trace of salt or salt vapor in contact with the parts contaminate the parts and leads to their early failure.

By the present invention there is provided a highly satisfactory apparatus and technique avoiding the shortcomings and uncertainties of prior soldering techniques. The parts to be silver soldered together are properly positioned against the opposite surfaces of the requisite film of silver solder or other fusion metal and rigidly and securely fastened together in this position. The parts are then placed within a chamber large enough to contain the same following which the chamber is closed and suitably sealed so that it may be maintained evacuated. The sealed chamber together with its evacuation connection is then sealed within a second surrounding chamber which is then sealed closed.

After the second chamber has been evacuated, it is filled with an inert gas free of any oxidant and the assembly is thereupon submerged within a molten mass of salt selected for its suitability for use at the temperature required to melt the particular solder being used. Throughout the heating process a vacuum is maintained on the inner chamber and inert gas is supplied under a pressure in excess of the liquid head acting on the outer chamber. It will be understood that, by this technique, salt vapor is prevented from migrating into the outer chamber. If there is any leakage or tendency of the inert medium to pass through the walls of the inner chamber it will be withdrawn immediately by the vacuum pump, but any such leakage will comprise only inert gas and not salt.

Accordingly, it is a primary object of the invention to provide an improved technique for the critical silver soldering of metal parts with greater precision and accuracy than heretofore possible.

Another object of the invention is the provision of a technique and apparatus for fuse-joining metal parts together with a minimum of fusion metal and with maximum assurance of a superior high strength and uniform joint.

Another object of the invention is the provision of an improved technique for silver soldering metal parts together by use of molten salt as the transfer medium but without risk of the slightest trace of salt penetrating to the parts being joined and without risk of the solder or the parts themselves undergoing oxidation during soldering.

Another object of the invention is the provision of a silver soldering technique wherein the parts undergoing soldering are separated from the surrounding mass of molten salt by pressurized inert gas through which the heat required for fusion of the solder is transferred.

These and other more specific objects will appear upon reading the following specification and claims and upon considering in connection therewith the attached drawing to which they relate.

Referring now to the drawing in which a preferred embodiment of the invention is illustrated, the figure is a vertical sectional view through apparatus suitable for practicing the present invention.

Referring to the single figure of the drawing, there is shown suitable apparatus designated generally 10 for practicing the present invention. This apparatus comprises an open-topped heat insulated tank furnace 11 having embedded closely adjacent its inner side wall electrical heaters 12 for maintaining molten therein a suitable salt 13. Numerous salts are commercially available for use in the soldering furnace here contemplated.

As is well known to those skilled in the salt furnace art the particular salt selected is one suitable for heating to the requisite temperature for the particular soldering operation and the particular soldering alloy to be used. For example, in silver soldering metal honeycomb core material to one or more face sheets of metal, a silver solder alloy having a melting temperature somewhat in excess of 1000° F. should be chosen. Having selected the solder to be used, the technician selects a commercial salt having operating characteristics known to be suitable for use with the selected soldering alloy.

The parts to be soldered are designated generally 15 and it will be understood that these parts, as for example, honeycomb sandwich components, may include an inner honeycomb core having the ends of its cells parallel to the adjacent faces of the face sheets to be fused thereto. If flat metal face sheets are to be soldered to the opposite ends of these cells as is customary, a thin film of the silver solder alloy would be placed against the opposite ends of the core cells following which the flatsheets would be placed against the outer surfaces of the solder and the entire assembly is firmly clamped together in known manner so that the parts may be handled as a unit. Preferably, the fastening means includes provision for applying substantially uniform pressure distributed across the outer surfaces of the face sheets. Inasmuch as techniques for holding the parts together are well known and form no part of this invention, such fastening means are not here illustrated.

The assembled components 15 are placed within an inner chamber here shown as being spherical in shape and including two halves 16 and 17 provided with radial flanges for convenience in clamping them together against an intervening gasket, as by a multiplicity of clamping bolts 18. A conduit 20 leads from the interior of this chamber to a vacuum pump diagrammatically indicated at 21.

The assembled inner chamber and its contents are then placed within an outer chamber 25 preferably sufficiently large as to enclose the same without contacting any part thereof. As here shown, outer casing 25 has an open top normally sealed closed by a cover 26 and fastening bolts 27. The inner chamber assembly may be suspended out of contact with all walls of the outer chamber by means of the evacuating conduit 20. Although not so shown, it will be understood that vacuum conduit 20 may be provided with suitable separable coupling means to facilitate assembly and disassembly of the chambers. Also to this end conduit 20 may comprise a suitable flexible hose constructed to resist collapse when operating under a vacuum, as it normally is. Extending from cover 26 is a second flexible hose or conduit 28 having suitable connection to means for supplying inert gas under pressure as well as other valve control means connected to the vacuum pump and by use of which outer chamber 25 may be evacuated before the inert gas is introduced.

In operation, let it be assumed that honeycomb components 15 to be fused together have been rigidly assembled in the manner referred to above and enclosed within the inner chamber formed by hemispheres 16 and 17. Let it further be assumed that this chamber has been tightly enclosed within outer chamber 25 and that conduits or hoses 20, 28 have been connected to vacuum pump 21 and to a source of inert gas, for example, argon or the like non-oxidizing medium.

Furnace 11 is then heated to melt salt 13 and to heat this salt to the requisite temperature for the fusion of the particular solder alloy then in use. It will be understood that heating elements 12 of the furnace may, and preferably do, include reliable and accurate means for maintaining the salt temperature at a selected desired value, as for example, 1160° F.

Prior to the lowering of the assembled inner and outer chambers within the molten salt bath, the vacuum pump is operated to remove all traces of oxygen from the interior of both chambers and pump 21 is continued in operation to maintain a continuous vacuum on the inner chamber. Once the air and any other contaminants have been removed from the chamber 30, inert gas is introduced and maintained within this chamber under a pressure preferably somewhat in excess of the maximum liquid head at any point within the molten salt bath. The assembly is maintained submerged under these constantly prevailing conditions for a sufficient time for the heat to reach and fuse the solder. Once this occurs, the assembly may be withdrawn from the salt bath and allowed to cool. Thereafter, the chambers are disassembled and the soldered unit is removed and inspected as other parts to be soldered are sealed within the chambers.

While the particular silver soldering apparatus and method herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. That improved method of silver soldering metal parts together which comprises, securing the parts to be soldered rigidly together against opposed surfaces of an intervening film of silver solder, enclosing these secured parts within an evacuated chamber, enclosing the latter chamber in a second fluid-tight chamber and pressurizing the latter with inert gas, and submerging both chambers within a molten salt bath maintained at a temperature adequate to liquefy said silver film, maintaining the chambers so submerged until a fusion of the solder occurs, and thereafter removing the parts undergoing soldering after the silver has taken a set.

2. That improvement in silver soldering parts together which comprises, securing the parts against an intervening film of silver solder, placing said secured parts within an evacuated chamber, safeguarding said evacuated chamber against the hazard of entrance of holt molten salt employed to fuse said solder by enclosing said chamber in a second chamber submerged in hot molten salt and pressurizing said second chamber with inert gas under a pressure at least as great as the maximum pressure head of molten salt acting at any point on the exterior of said second chamber.

3. That method of silver soldering parts together which comprises maintaining a bath of molten salt at a temperature in excess of that required to fuse silver solder, securing the parts to be soldered against the opposite surfaces of a film of silver solder, sealing said parts in an enclosing chamber, drawing a vacuum on said chamber, placing said chamber in a second chamber, replacing the air in said second chamber with an inert gas, submerging both of said chambers in a molten salt bath sufficiently hot to fuse said film of solder between the parts being soldered, and allowing said silver solder to fuse before removing said chambers from said molten salt.

4. That method of silver soldering defined in claim 3 characterized in maintaining the inert gas in said second chamber under pressure in excess of the maximum static head of molten salt acting on said second chamber while submerged in said salt bath.

5. In combination, apparatus for silver soldering parts together which apparatus comprises means for containing a body of heated molten salt, first and second sealable chamber means of different sizes adapted to be assembled one within the other and submerged in the body of molten salt, said first chamber means being adapted to contain the parts to be silver soldered with a film of silver solder clutched between the surfaces to be fused together, said first chamber means being enclosable within said second chamber means, means for evacuating said first chamber means after the parts to be soldered are enclosed therewithin, and means for filling the space between said first and second chamber means with pressurized inert gas.

6. In combination, apparatus for silver soldering parts together which apparatus comprises means for containing a body of heated molten salt, first and second sealable chamber means of different sizes adapted to be assembled one within the other and submerged in the body of molten salt, said first chamber means being adapted to contain the parts to be silver soldered with a film of silver solder clutched between the surfaces to be fused together, said first chamber means being enclosable within said second chamber means, means for evacuating said first chamber means after the parts to be soldered are enclosed therewithin, and means for replacing the air initially present between said first and second chamber means with pressurized inert gas and for maintaining the pressure of said inert gas at a value in excess of the head of molten salt acting on said second chamber means while submerged in said body of molten salt.

7. Silver soldering apparatus as defined in claim 6 characterized in that said first and second chamber means each include closure means by which access may be had to the interiors of each for the repeated charging and removal of parts undergoing silver soldering.

References Cited in the file of this patent

UNITED STATES PATENTS

| 432,651 | Thomson | July 22, 1890 |
| 2,154,273 | Kollsman | Apr. 11, 1939 |
| 2,747,066 | Brace | May 22, 1956 |
| 2,845,698 | Giovannucci et al. | Aug. 5, 1958 |
| 2,979,005 | Herbert | Apr. 11, 1961 |

FOREIGN PATENTS

| 27,628 | Great Britain | of 1906 |